(12) United States Patent
Okajima et al.

(10) Patent No.: US 6,647,826 B2
(45) Date of Patent: Nov. 18, 2003

(54) BICYCLE PEDAL

(75) Inventors: Shinpei Okajima, Izumi (JP); Masao Kojima, Izumi (JP)

(73) Assignee: Shimano, Inc., Osaka (JP)

( * ) Notice: Subject to any disclaimer, the term of this patent is extended or adjusted under 35 U.S.C. 154(b) by 181 days.

(21) Appl. No.: 09/771,623

(22) Filed: Jan. 30, 2001

(65) Prior Publication Data

US 2002/0100343 A1 Aug. 1, 2002

(51) Int. Cl.[7] .................................................. G05G 1/16
(52) U.S. Cl. ........................................ 74/594.4; 74/563
(58) Field of Search ............................. 74/594.4, 594.6, 74/563

(56) References Cited

U.S. PATENT DOCUMENTS

| | | | | |
|---|---|---|---|---|
| 1,297,202 A | * | 3/1919 | McGiehan | 74/563 |
| 2,587,270 A | | 2/1952 | Albers | 74/594.4 |
| 3,592,076 A | | 7/1971 | Baginski et al. | 74/594.5 |
| 3,807,255 A | | 4/1974 | Baginski | 74/594.4 |
| D236,708 S | * | 9/1975 | Konzorr | D12/125 |
| 4,335,628 A | | 6/1982 | Shimano | 74/594.4 |
| 4,411,169 A | | 10/1983 | Takeda | 74/594.4 |
| D280,192 S | | 8/1985 | Watanabe | D12/125 |
| D286,996 S | * | 12/1986 | Hartmann et al. | D12/125 |
| D291,293 S | * | 8/1987 | Downing et al. | D12/125 |
| D299,449 S | | 1/1989 | Chounan | D12/125 |
| 4,840,085 A | * | 6/1989 | Nagano | 74/594.4 |
| 4,873,890 A | * | 10/1989 | Nagano | 74/560 |
| D333,113 S | * | 2/1993 | Nestrud | D12/125 |

FOREIGN PATENT DOCUMENTS

| | | | | |
|---|---|---|---|---|
| DE | 4203777 | * | 7/1993 | B62M/3/10 |
| JP | 503246 | | 1/1975 | |
| JP | 74285 | | 1/1995 | |

* cited by examiner

Primary Examiner—Thomas R. Hannon
Assistant Examiner—Vicky A. Johnson
(74) Attorney, Agent, or Firm—Shinjyu Global IP Counselors, LLP

(57) ABSTRACT

The bicycle pedal includes a pedal shaft, a pedal body and an abrasive sheet coupled to a shoe engagement surface to enhance engagement of the pedal with a shoe. The pedal body is rotatably coupled to the second end of the pedal shaft. The shoe engagement surface preferably includes a recess with first and second curvatures. The first curvature has a first radius and the second curvature has a second radius larger than the first radius. The abrasive sheet is preferably coupled within the recess. Frictional characteristics are improved by a method including the steps of forming a pedal body with a recess and coupling an abrasive sheet in the recess of the pedal body. The abrasive sheet is positioned to resist peeling of the abrasive sheet from the pedal body. The pedal body can be formed of one or more pieces.

28 Claims, 10 Drawing Sheets

US 6,647,826 B2

BICYCLE PEDAL

BACKGROUND OF THE INVENTION

1. Field of the Invention

This invention generally relates to a bicycle pedal. More specifically, the present invention relates to a platform type bicycle pedal, which has improved frictional characteristics.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the bicycle pedal.

In recent years, bicycle pedals have been designed for specific purposes, such as for pleasure, off-road biking, road racing, etc. Generally, there are two basic types of bicycle pedals available. One particular type of bicycle pedal, which is gaining more popularity, is the step-in or clipless pedal, which releasably engages a cleat secured to a sole of a cyclist's shoe. Another particular type of bicycle pedal, which is gaining more popularity is the typical platform type bicycle pedal.

The clipless pedal has a pedal spindle that can be mounted on the crank of a bicycle, a pedal body that is rotatably supported on this pedal spindle, and a cleat engagement mechanism. In this type of bicycle pedal, the rider steps onto the pedal and the cleat engagement mechanism automatically grips on to the cleat secured to the bottom of the cyclist's shoe. These clipless bicycle pedals contribute to an efficient transfer of power from the cyclist's shoe to the crank via the clipless pedal. However, these clipless bicycle pedals can be complicated and expensive to manufacture. Additionally, these clipless pedals can be undesirable in certain riding conditions. For example, clipless bicycle pedals can be undesirable when the cyclist needs to continually engage and release the cyclist's shoe from the clipless pedal.

In recent years, downhill races, dual slalom races, cross-country races and other such off-road races for mountain bikes and BMX (bicycle moto-cross) have been widely staged. In any of these off-road type races, the foot must be repeatedly taken off the pedal during cornering and replaced on the pedal after the corner has been exited. Additionally, in city or commuting type bicycling, the cyclist's shoe must be repeatedly released from and re-engaged with the pedal. Another problem with most clipless pedals is that they are quite small and can have several moving parts. As a result of these types of pedal designs, the moving parts often can become clogged with dirt or mud in wet riding conditions. Dirt or mud can affect the release of the cleat from the clipless pedal, or affect insertion of the cleat into the clamping members of the clipless pedal. Furthermore, these clipless pedals can be complicated and expensive to manufacture and assemble.

Because of some of the problems with clipless pedals, platform pedals are often used for certain riding situations. The platform pedal has a pair of oppositely facing shoe engagement surfaces. Thus, platform bicycle pedals are sometimes used in BMX (bicycle moto-cross), downhill races, dual slalom races, cross-country races, other off-road races for mountain bikes, city or commuter type bicycles, or any bicycle in which the cyclist's shoe needs to be repeatedly removed from and replaced onto the bicycle pedal.

The platform pedal usually does not include a clamping mechanism to directly couple the cyclist's shoe to the bicycle pedal. The platform pedal typically has a pedal spindle that can be mounted on the crank of a bicycle, a pedal body that is rotatably supported on this pedal spindle and a pair of oppositely facing shoe engagement surfaces. While these platform pedals allow the cyclist to repeatedly remove the cyclist's shoe from the pedal during cornering and replace the cyclist's shoe on the pedal after cornering, these pedals often lack the efficient power transfer characteristics of a clipless bicycle pedal. Additionally, platform pedals are usually heavy and lack the secure feel of clipless pedals. Moreover, these platform pedals can also become clogged with dirt or mud in wet riding conditions. Furthermore, some of these platform pedals can be complicated and expensive to manufacture and assemble.

In view of the above, there exists a need for a bicycle pedal which overcomes the above mentioned problems in the prior art. This invention addresses this need in the prior art as well as other needs, which will become apparent to those skilled in the art from this disclosure.

SUMMARY OF THE INVENTION

One object of the present invention is to provide a platform type bicycle pedal with improved frictional characteristics for engaging a shoe sole.

Another object of the present invention is to provide a platform bicycle pedal which is relatively simple and inexpensive to manufacture and assemble.

Another object of the present invention is to provide a platform bicycle pedal, which allows the efficient power transfer and feel of a clipless pedal.

Still another object of the present invention is to provide a bicycle pedal that is strong, yet relatively lightweight.

Still another object of the present invention is to provide a bicycle pedal, which limits or prevents dirt, mud or the like, from adversely affecting the frictional characteristics of the bicycle pedal.

The foregoing objects can basically be attained by providing a bicycle pedal comprising a pedal shaft, a pedal body and a first abrasive sheet. The pedal shaft has a first end adapted to be coupled to a bicycle crank and a second end. The pedal body is rotatably coupled to the second end of the pedal shaft. The pedal body has a first concave shoe engagement surface facing in a first direction. The first abrasive sheet is fixedly coupled to the first concave shoe engagement surface. The first concave shoe engagement surface and the first abrasive sheet are configured to enhance engagement of the pedal with a shoe.

The foregoing objects can also basically be attained by providing a bicycle pedal comprising a pedal shaft, a pedal body and an abrasive sheet. The pedal shaft has a first end adapted to be coupled to a bicycle crank and a second end. The pedal body is rotatably coupled to the second end of the pedal shaft. The pedal body has a concave shoe engagement surface with first and second curvatures. The first curvature has a first radius and the second curvature has a second radius larger than the first radius. The abrasive sheet is fixedly coupled to the concave shoe engagement surface. The concave shoe engagement surface and the abrasive sheet are configured to enhance engagement of the pedal with a shoe.

The foregoing objects can basically be attained by providing a bicycle pedal comprising a pedal shaft, a pedal body and an abrasive sheet. The pedal shaft has a first end adapted to be coupled to a bicycle crank and a second end. The pedal body is rotatably coupled to the second end of the pedal shaft. The pedal body has a shoe engagement surface with a recess. The abrasive sheet is fixedly coupled within the recess to enhance engagement of the pedal with a shoe.

The foregoing objects can basically be attained by providing a method of improving frictional characteristics of a bicycle pedal comprising the steps of forming a pedal body and fixedly coupling an abrasive sheet to the pedal body. The pedal body is formed with a shoe engagement surface having a recess. The abrasive sheet is fixedly coupled in the recess such that the abrasive sheet is positioned to resist peeling of the abrasive sheet from the pedal body.

These and other objects, features, aspects and advantages of the present invention will become apparent to those skilled in the art from the following detailed description, which, taken in conjunction with the annexed drawings, disclose preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
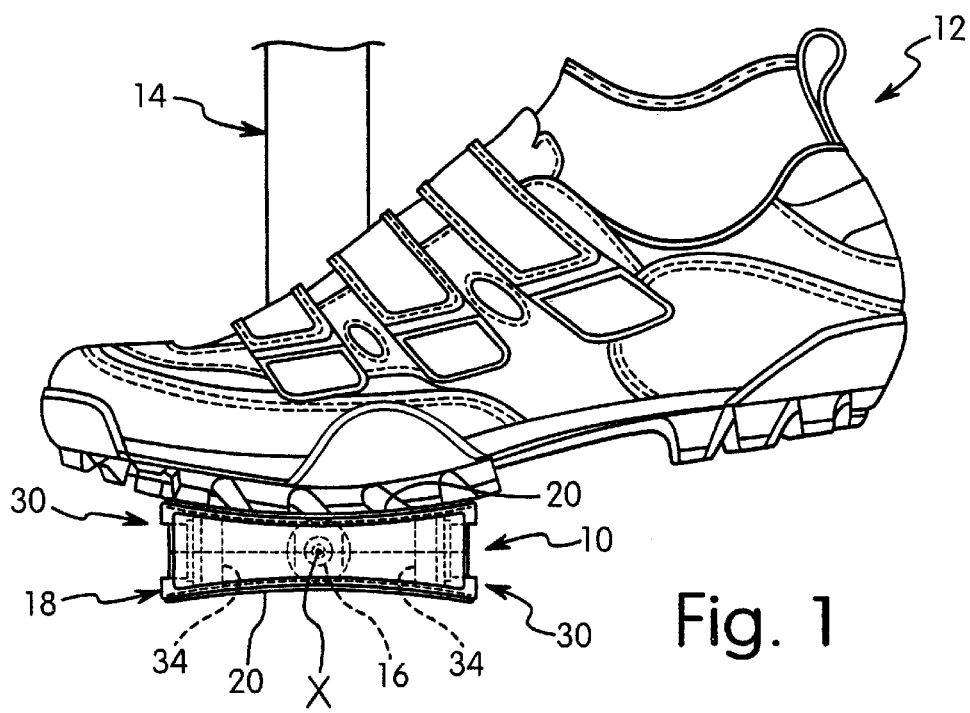
FIG. 1 is a side elevational view of a left bicycle pedal with a shoe contacting an upper surface of the bicycle pedal in accordance with a preferred embodiment of the present invention.
Figure 2:
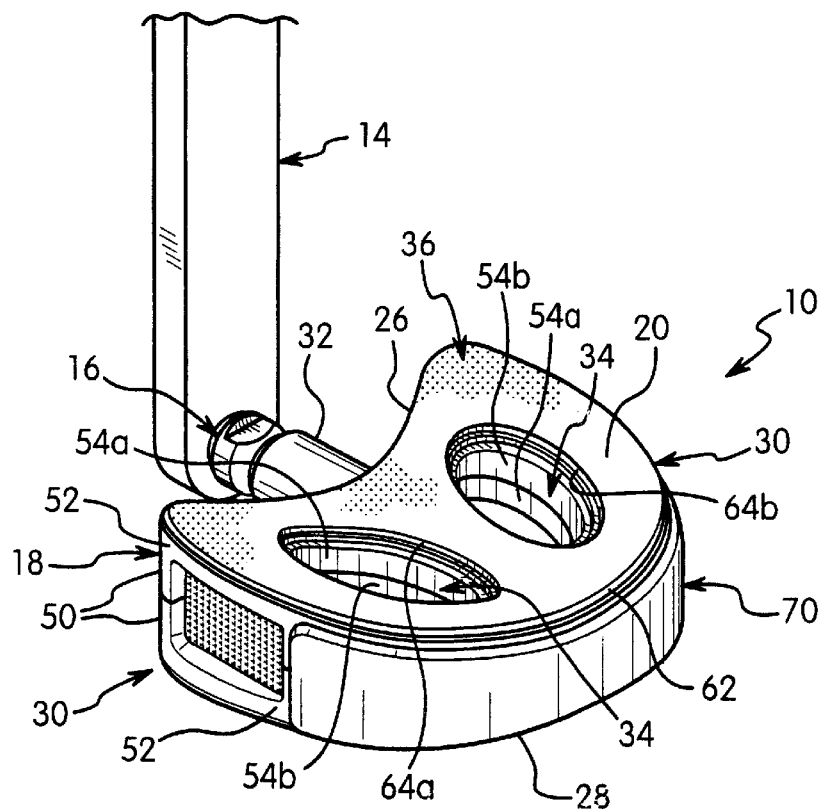
FIG. 2 is an enlarged perspective view of the bicycle pedal illustrated in FIG. 1 showing the pedal shaft coupled to a crank arm.

Referring initially to FIGS. 1–2, a bicycle pedal 10 is illustrated in accordance with a preferred embodiment of the present invention. Bicycle pedal 10 is a low profile platform type bicycle pedal that can be used with a shoe 12. Bicycle pedal 10 is especially designed for use with off-road, city or commuter type bicycles. Of course, bicycle pedal 10 can be used on a road bicycle or any type of bicycle, if needed and/or desired. As seen in FIG. 2, bicycle pedal 10 is fixedly coupled to bicycle crank arm 14 of a bicycle for rotation therewith. Bicycle pedal 10, illustrated in FIGS. 1–2 is a left pedal but can be used as a left, or right side bicycle pedal. Of course, the same pedals are provided on the left and right sides of the bicycle, except that the right side pedal is a mirror image of the left side pedal. More specifically, the right side pedal is identical to the left side pedal except the configuration of the threaded end of the pedal shaft, as discussed in more detail below.

Figure 3:
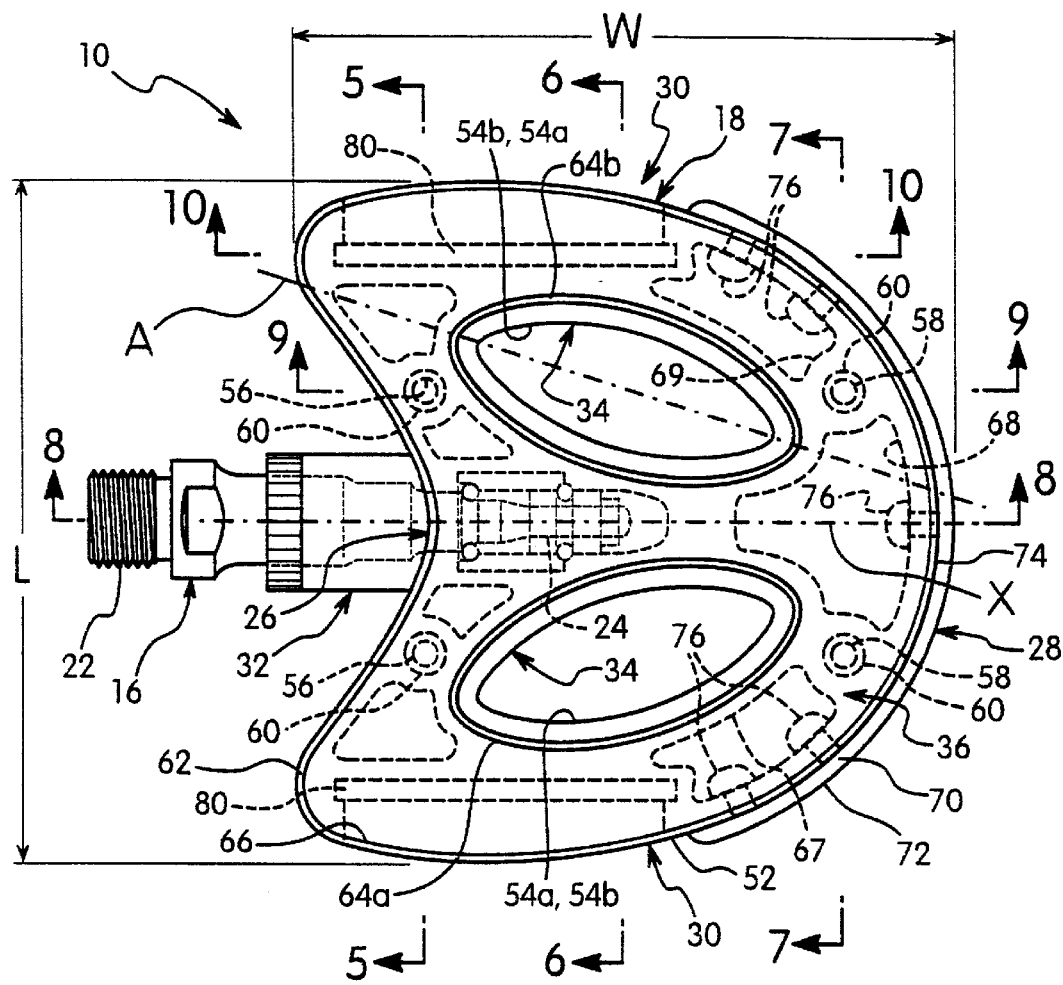
FIG. 3 is a top plan view of the bicycle pedal illustrated in FIGS. 1–2.
Figure 4:
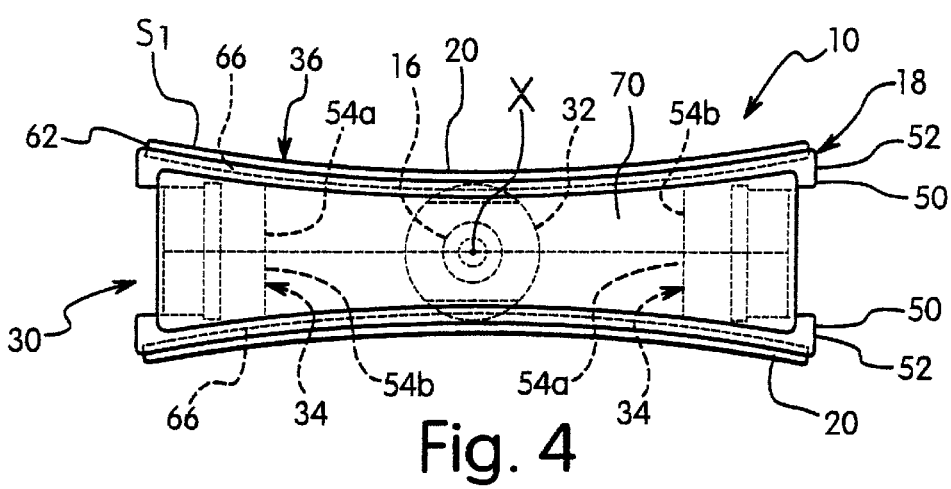
FIG. 4 is an outside end elevational view of the bicycle pedal illustrated in FIGS. 1–3.

As seen in FIGS. 1–3, bicycle pedal 10 basically includes a pedal shaft or pedal shaft 16 adapted to be coupled to crank arm 14, a pedal body 18 rotatably coupled to pedal shaft 16 for supporting a cyclist's foot, and a pair of abrasive sheets 20 fixedly coupled to opposite sides of pedal body 18. Pedal shaft 16 basically includes a first end 22, a second end 24 and a center axis X extending therethrough. Pedal body 18 basically includes inner and outer longitudinal sides 26 and 28 extending between a pair of ends 30, and a shaft support portion 32. Pedal body 18 also preferably includes a pair of through openings 34 extending between a pair of shoe engagement surfaces 36. Shaft support portion 32 rotatably couples pedal body 18 to second end 24 of pedal shaft 16, while first end 22 of pedal shaft 16 is adapted to be fixedly coupled to crank arm 14. Abrasive sheets 20 are fixedly coupled to shoe engagement surfaces 36 to improve the frictional characteristics of the shoe engagement surfaces 36. Each abrasive sheet 20 basically includes an abrasive surface 40, an attachment surface 42 and a pair of apertures 44 that align with openings 34 of pedal body 18 when attached thereto. Preferably, each attachment surface 42 is fixedly coupled to one of the shoe engagement surfaces 36 via adhesive, as discussed below in more detail.

Referring now to FIGS. 2–4, 6 and 9, pedal body 18 is preferably formed of two plate-shaped foot supporting pieces 50 fixedly coupled together. Foot supporting pieces 50 are preferably formed of molded plastic material and are preferably identical to each other. Thus, only one of the foot supporting pieces 50 will be discussed herein. Each foot supporting piece 50 is preferably formed as a symmetrical plate-shaped member with one of the shoe engagement surfaces 36 formed on an outer end thereof. A curved outer peripheral wall 52 preferably extends substantially perpendicular to its respective shoe engagement surface 36. Each foot supporting piece 50 has a pair of interior walls 54*a* and 54*b* that form part of openings 34. Thus, each opening 34 is formed of the interior wall 54*a* of one of the foot supporting pieces 50 and the interior wall 54*b* of the other of the foot supporting pieces 50. Additionally, in the illustrated embodiment, each foot supporting piece 50 of pedal body 18 includes a plurality of cup-shaped open areas or hollow areas in order to reduce the weight of pedal body 18.

Foot supporting pieces 50 are preferably fixedly coupled to each other via a plurality of fasteners 60 to form pedal body 18. More specifically, each foot supporting piece 50 includes a pair of inner through holes 56 extending therethrough and a pair of outer through holes 58 extending therethrough. The fasteners 60 are preferably arranged in through holes 56 and 58. In the illustrated embodiment, fasteners 60 are conventional rivets. Thus, fasteners 60 will not be discussed or illustrated herein. Each of the through holes 56 and 58 has an abutment shoulder adjacent it's respective shoe engagement surface 36 to engage an enlarged head of one of the fasteners or rivets 60.

The two outer through holes 58 of one of the foot supporting pieces 50 are aligned with the two outer through holes 58 the other of the foot supporting pieces 50. The pair of inner through holes 56 of one of the foot supporting pieces 50 are aligned with the inner through holes 56 of the other of the foot supporting pieces 50. In other words, two pairs of attachment holes with oppositely facing abutment shoulders are formed in pedal body 18 to fixedly couple foot supporting pieces 50 together via a plurality of fasteners 60. When foot supporting pieces 50 are fixedly coupled together, portions of each of the outer peripheral walls 52 form the inner and outer longitudinal sides 26 and 28 of pedal body 18. Additionally, portions of the outer peripheral walls 52 of each foot supporting piece 50 also form the ends 30 (as seen in FIGS. 1 and 2) of pedal body 18.

Of course, it will be apparent to those skilled in the art that foot supporting pieces 50 of pedal body 18 can be fixedly coupled together by any suitable method. For example, foot supporting pieces 50 of pedal body 18 could be fixedly coupled together by a plurality of nuts/bolts, screws, or welded together by supersonic wave welding. Moreover, it will be apparent to those skilled in the art from this disclosure that foot supporting pieces 50 could be constructed of other materials, as needed and/or desired. For example, foot supporting pieces 50 could be constructed of a metallic material. It will also be apparent to those skilled in the art from this disclosure that pedal body 18 could be formed as a one-piece unitary member, if needed and/or desired, and discussed below with reference to another embodiment of the present invention. Pedal body 18 can be formed by any suitable manufacturing technique such as injection molding and/or machining.

Referring to FIGS. 3 and 5–10, shoe engagement surfaces 36 will now be discussed in more detail. As discussed above, each of the shoe engagement surfaces 36 is formed on an outer end of one of the foot supporting pieces 50 of pedal body 18. In other words, one shoe engagement surface 36 faces in a first direction, while the other shoe engagement surface 36 faces in a second direction opposite the first direction. Each shoe engagement surface 36 preferably includes an outer peripheral wall 62, a pair of inner peripheral walls 64*a* and 64*b*, and a recess 66.

Recess 66 is formed by the continuous wall 62 located around an outer periphery of pedal body 22. Thus, continuous wall 62 extends around the outer periphery of recess 66. Each recess 66 is further defined by a pair of inner continuous walls 64*a* and 64*b*, which extend around openings 34 of pedal body 18. More specifically, inner continuous walls 64*a* and 64*b* are slightly spaced from first and second interior walls 54*a* and 54*b* of each foot supporting piece 50 of pedal body 18. Therefore, inner continuous walls 64*a* and 64*b* together with outer continuous wall 62 together preferably form recess 66 therebetween. Preferably, continuous walls 62, 64*a* and 64*b* extend approximately 0.5 millimeters from an end surface of recess 66. In other words, each recess 66 has a depth of approximately 0.5 millimeters. The abrasive sheet 20 are preferably fixedly coupled within the recesses 66 to enhance frictional engagement of pedal 10 with shoe 12, as discussed in more detail below.

While in the illustrated embodiment, walls 62, 64*a* and 64*b* are continuous walls that form each recess 66, it will be apparent to those skilled in the art from this disclosure that these walls could be discontinuous, as discussed later with reference to another preferred embodiment of the present invention. In any event, each shoe engagement surface 36 of pedal body 18 preferably has a recess 66 formed by interior and exterior side walls (and at least by an outer boundary).

Referring still to FIGS. 5–10, each shoe engagement surface 36 with its respective recess 66 is preferably a concave curved shoe engagement surface. More specifically, the curved shoe engagement surfaces 36 are preferably formed by the combination of two curvatures. More specifically, each concave shoe engagement surface 36 preferably includes a first curvature $S_1$ that lies in a first plane, i.e., along section line 5—5, and a second curvature $S_2$ that lies in a second plane, i.e., along section line 8—8. The first plane is preferably substantially perpendicular to the second plane. The first plane preferably intersects and extends substantially perpendicular to center axis X of pedal shaft 16. Thus, the second plane is preferably substantially parallel to the center axis X of pedal shaft 16. In other words, the first curvature crosses the second curvature.

Figure 5:
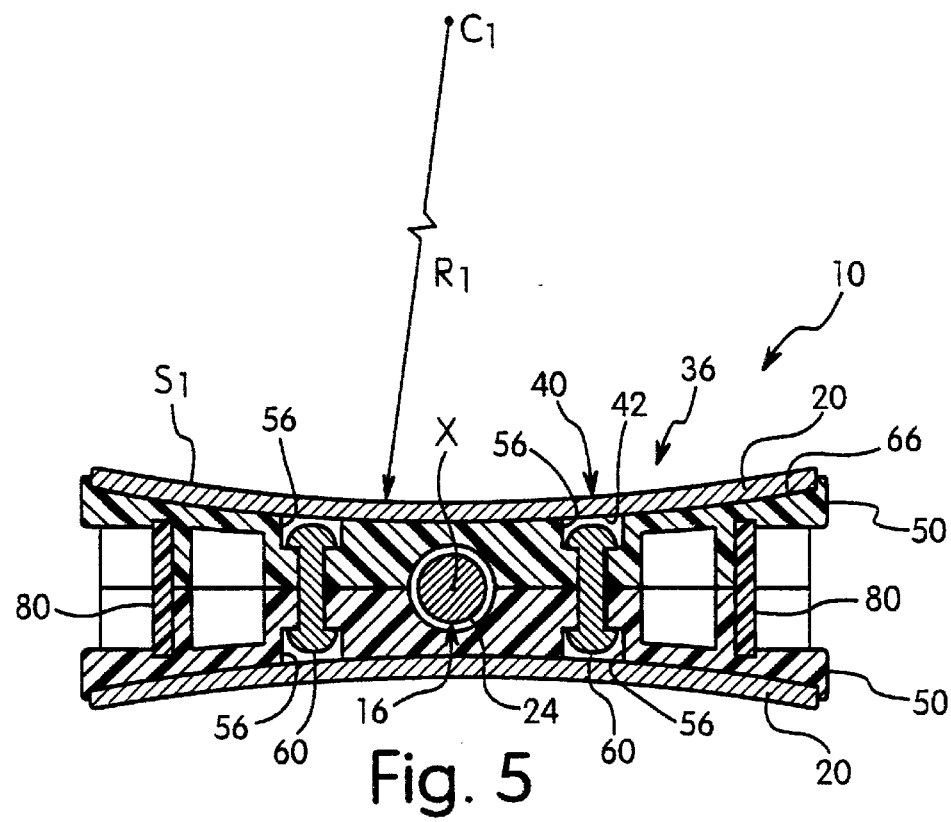
FIG. 5 is a cross-sectional view of the bicycle pedal illustrated in FIGS. 1–4 as viewed along section line 5—5 of FIG. 3.
Figure 6:
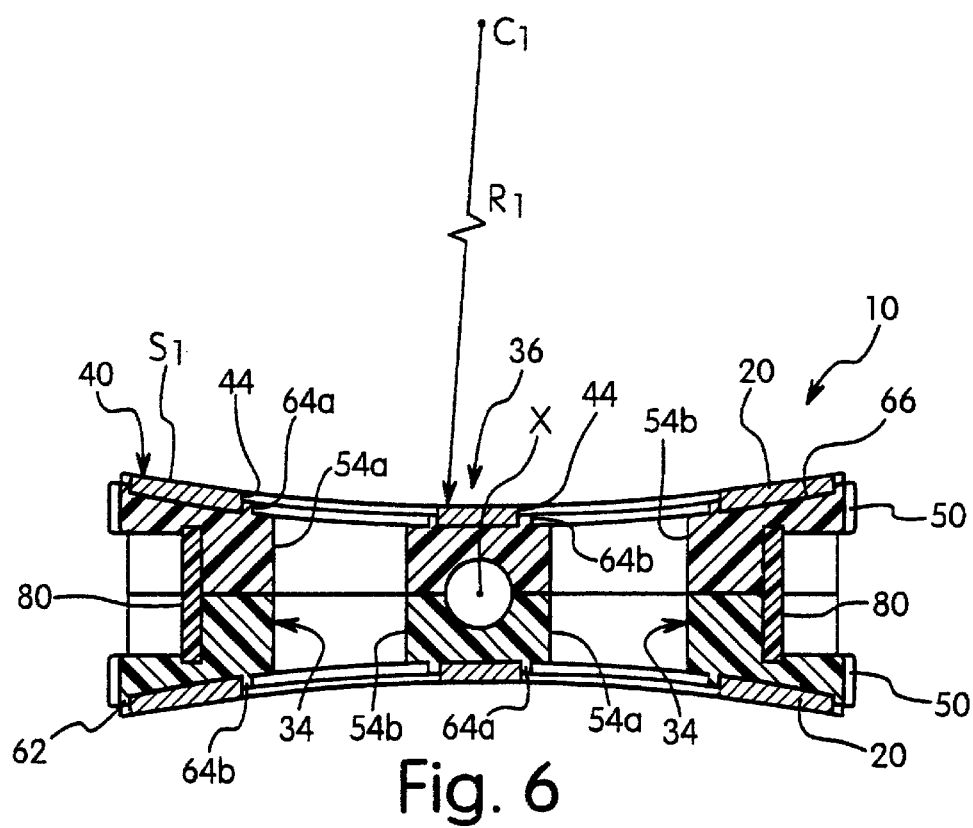
FIG. 6 is a cross-sectional view of the bicycle pedal illustrated in FIGS. 1–4 as viewed along section line 6—6 of FIG. 3.
Figure 7:
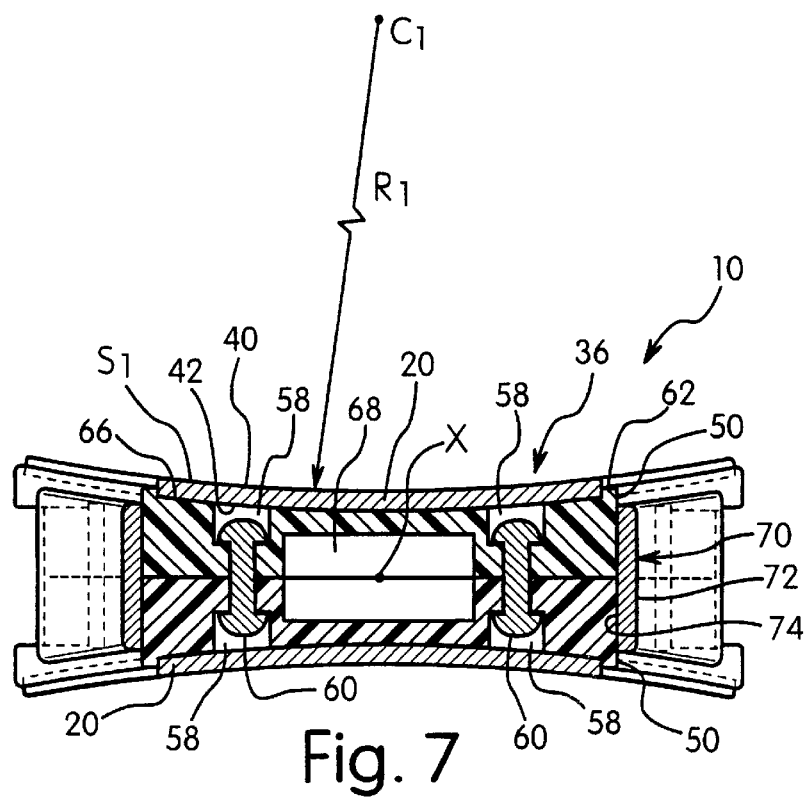
FIG. 7 is a cross-sectional view of the bicycle pedal illustrated in FIGS. 1–4 as viewed along section line 7—7 of FIG. 3.
Figure 8:
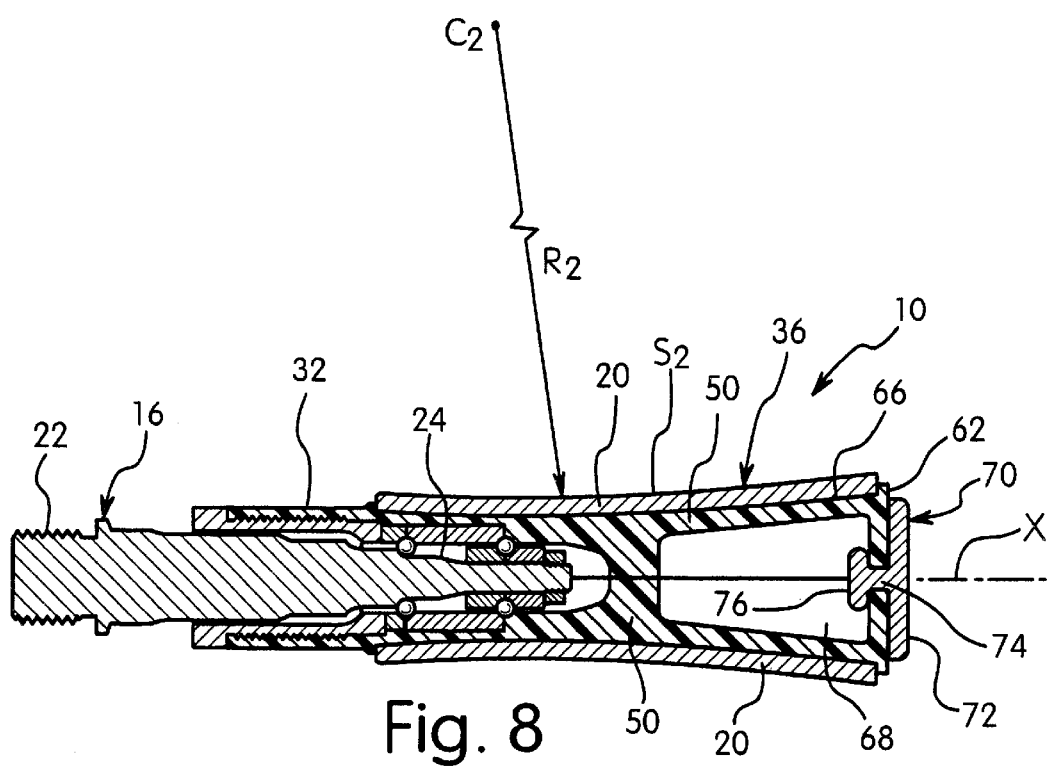
FIG. 8 is a cross-sectional view of the bicycle pedal illustrated in FIGS. 1–4 as viewed along section line 8—8 of FIG. 3.
Figure 9:
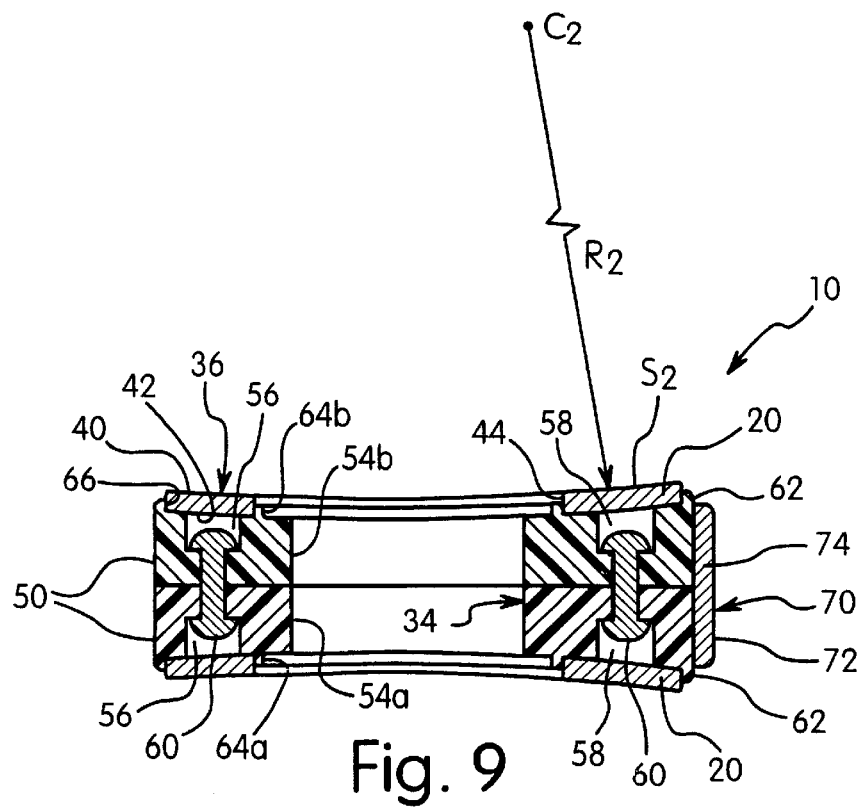
FIG. 9 is a cross-sectional view of the bicycle pedal illustrated in FIGS. 1–4 as viewed along section line 9—9 of FIG. 3.
Figure 10:
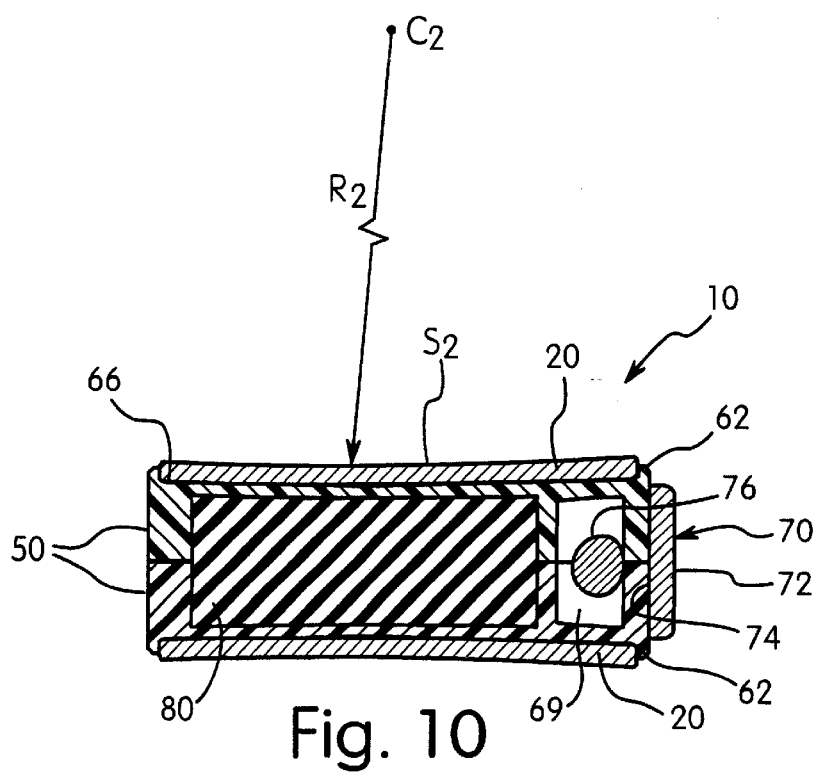
FIG. 10 is a cross-sectional view of the bicycle pedal illustrated in FIGS. 1–4 as viewed along section line 10—10 of FIG. 3.

The first curvature is preferably formed on a circle that has a first center $C_1$ and a first radius $R_1$ of approximately 270 millimeters ±10%, while the second curvature lies on a circle that has a second center $C_2$ and a second radius $R_2$ of approximately 400 millimeters ±10%. The first curvature is illustrated in FIGS. 5–7, while the second curvature is illustrated in FIGS. 8–10. Therefore, second curvature $S_2$ has a second radius $R_2$ about 1.2 to 1.8 time large than first radius $R_1$ of first curvature $S_1$ (i.e., the ratio of $R_2/R_1$ is about 1.2 to 1.8). The configuration of each curved shoe engagement surface 36 enhances frictional engagement of pedal 10 with shoe 12. Thus, pedal 10 can have a feel similar to a clipless type bicycle pedal. Additionally, the configuration of each curved shoe engagement surface 36 allows each respective abrasive sheet 20 to be fixedly coupled thereto without any wrinkles. More specifically, the presence of through openings 34 together with the configuration of each curved shoe engagement surface 36 prevents wrinkling of each abrasive sheet 20 when fixedly coupled to pedal body 18.

The outer continuous wall 62 and the inner continuous walls 64*a* and 64*b* provide two functions for bicycle pedal 10. First, sidewalls 62, 64a and 64b preferably extend at least part of the thickness of each abrasive sheet 20 to prevent peeling of abrasive sheets 20 from pedal body 18. Second, walls 62, 64a and 64b aid in providing enhanced frictional engagement of pedal 10 with shoe 12 even if abrasive sheet 20 peels off of pedal body 18. Thus, an improved engagement and feel can be achieved, such as with a clipless type bicycle pedal.

Referring to FIGS. 5–7 and 9, abrasive sheet 20 will now be discussed in more detail. As mentioned above, each abrasive sheet 20 basically includes abrasive surface 40, attachment surface 42 and the pair of apertures 44. Apertures 44 are configured to be aligned with openings 34 of pedal body 18. More specifically, apertures 44 are slightly larger than opening 34 and have substantially the same shape as openings 34. Thus, each abrasive sheet 20 can be fixedly coupled to a concave shoe engagement surface without wrinkling. Attachment surface 42 is preferably a flexible material with adhesive material applied thereto.

A removable backing is preferably applied to the adhesive material. Prior to mounting abrasive sheets 20 to pedal body 18, the removable backing is removed to expose the adhesive. Thus, during assembly, protective cover material is removed from the abrasive material, and the abrasive sheet 20 is attached to the curved shoe engagement surface 36 (i.e., in a manner similar to applying sticker). Each abrasive sheet 20 preferably has a thickness of approximately 0.7 millimeters. Thus, abrasive sheets 20 preferably extend beyond continuous outer wall 62, inner wall 64a and inner wall 64b (height of about 0.5 millimeters). Abrasive sheets 20 are preferably configured similar to a sandpaper material with abrasive particles coupled thereto. More specifically, abrasive sheets 20 are preferably formed of vinyl chloride sheets with abrasive sand or glass particles fixedly coupled thereto in a conventional manner. Such abrasive sheets are well known in the art, and thus, will not be discussed or illustrated in detail herein.

Pedal body 18 preferably has a longitudinal length L and a transverse width W smaller than the longitudinal length as seen in FIG. 3. More, specifically, pedal body 18 preferably has a maximum longitudinal length L (measured between ends 30) of about 104 millimeters, and a transverse width W of about 94 millimeters. Additionally, pedal body 18 preferably has a minimum thickness of about 20.7 millimeters. Therefore, when abrasive sheets 20 are fixedly coupled to pedal body 18, pedal 10 has a minimum thickness of about 22.1 millimeters. The thickness of pedal 10 is measured along a vertical plane when pedal 18 is in a horizontal position. The minimum thickness of pedal 10 is measured along a vertical plane passing through center axis X of pedal shaft 16. Due to the configuration of the curved shoe engagement surfaces 36 and the thickness of pedal body 18, pedal 10 offers improved stability.

Referring to FIGS. 3, 5 and 7–10, pedal body 18 preferably has a plurality of hollow areas formed therein to reduce the weight of pedal body 18, as mentioned above. More specifically, pedal body 18 preferably includes three outer hollow areas 67–69 for coupling a side protection element thereto, as discussed below in more detail. Each foot supporting piece 50 includes a plurality of small notches formed at their intersection to form a plurality of attachment openings extending into hollow areas 67–69. In the illustrated embodiment, several inner hollow areas are also provided to reduce the weight of pedal 10.

Additionally, each foot supporting piece 50 includes a pair of inwardly extending open ended reflector slots formed in opposite ends of each foot supporting pieces 50. Thus, when hub body 18 is assembled, a pair of reflectors 80 are retained in the reflector slots between foot supporting pieces 50 (i.e. sandwiched in-between the pair of foot supporting pieces 50 of the pedal body 18). Reflectors 80 are preferably formed of plastic material and are relatively conventional. Thus, reflectors 80 will not be discussed or illustrated in detail herein. Of course it will be apparent to those skilled in the art that reflectors 80 could be retained by any suitable technique such as a press fit or adhesive. Moreover, it will be apparent to those skilled in the art that the slots of foot supporting pieces 50 could be modified as needed and/or desired, as discussed below with reference to another embodiment of the present invention.

Openings 34 of pedal body 18 will now be discussed in more detail. Preferably, openings 34 are oval-shaped openings that extend between shoe engagement surfaces 36. Specifically, openings 34 are preferably substantially perpendicular to shoe engagement surfaces 36, as seen in FIGS. 6 and 9. Moreover, openings 34 are elongated openings, each extending along a longitudinal axis (e.g., axis A) angled relative to the center axis X of pedal shaft 16. Each opening 34 can be substantially symmetrical about the corresponding longitudinal axis along which it extends. For example, FIG. 3 shows that one of the openings 34 is substantially symmetrical about the longitudinal axis A. Openings 34 are also enlarged openings formed at a middle area (relative to inner and outer longitudinal sides 26 and 28) allowing mud and debris to freely pass therethrough. Additionally, due to the size and configuration of openings 34, abrasive sheets 20 are provided without any extremely large areas. Thus, wrinkles are prevented in abrasive sheets 20. In other words, openings 34 provide a dual function for bicycle pedal 10. Furthermore, openings 34 reduce the weight of bicycle pedal 10.

As best seen in FIGS. 3, 8, 10 and 11, pedal body 18 preferably includes a side protection element 70 coupled thereto. More specifically, pedal body 18 preferably has pedal shaft 16 extending from inner longitudinal side 26 with side protection element 70 coupled to outer longitudinal side 28. Side protection element 70 is preferably a curved plate-shaped member formed of metal or soft plastic. In the illustrated embodiment, side protection element 70 is formed of metallic material. Of course it will be apparent to those skilled in the art that side protection element 70 could be constructed of any suitable material as needed and/or desired. Side protection element 70 basically has an outer curved surface 72 and an attachment portion 74. Attachment portion 74 preferably includes a plurality of attachment protrusions 76 extending therefrom.

In the illustrated two-piece pedal body 18, attachment portion 74 is preferably formed of a plurality of protrusions 76 with enlarged heads at their free ends. The protrusions are configured to be received in mating slots of foot supporting pieces 50 of pedal body 18 (i.e. the attachment holes). The flanges of the protrusions are configured to engage an internal surface of the outer peripheral walls 52 of the foot supporting pieces 50 of pedal body 18. Of course, it will be apparent to those skilled in the art from this disclosure that side protection element 70 can be fixedly coupled to pedal body 18 by any suitable method. For example, side protection element 70 could be coupled to pedal body 18 by a plurality of fasteners or via adhesive. More specifically, if pedal body 18 is constructed as a one-piece unitary member, side protection element 70 could be constructed with a plurality of projections configured to be press-fitted or snap-fitted into openings of pedal body 18. Alternatively, if pedal body 18 is constructed as a one-piece unitary member, side protection element 70 could be coupled to pedal body 18 via adhesive.

Figure 11:
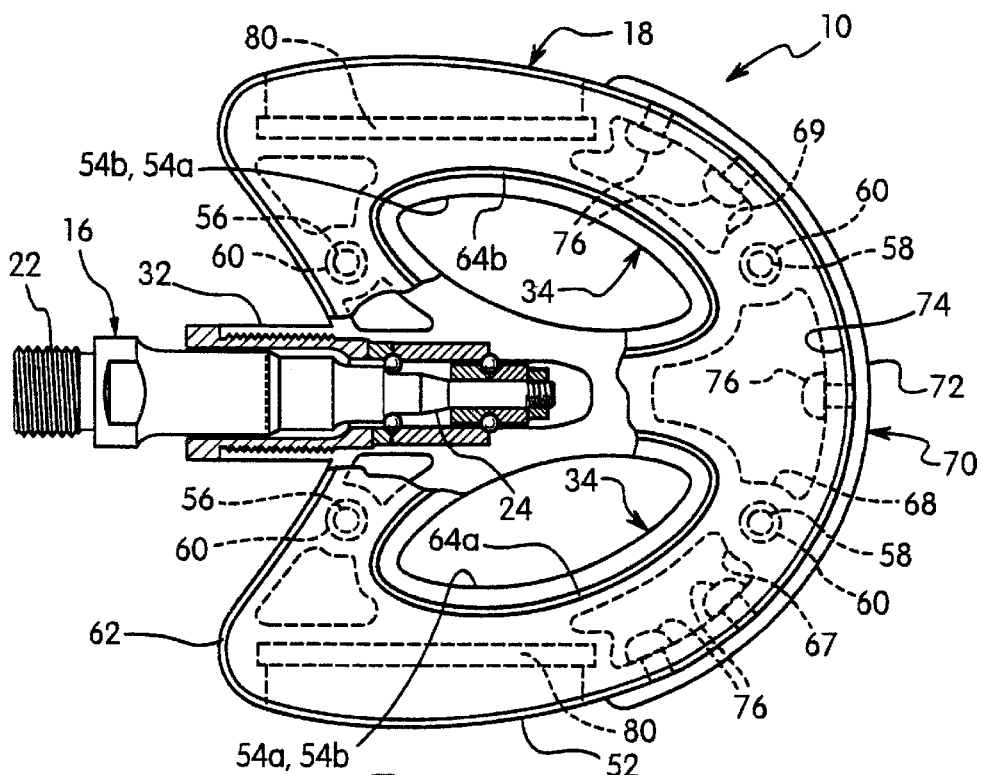
FIG. 11 is a top plan view of the bicycle pedal illustrated in FIGS. 1–10, with portions broken away for the purpose of illustration.

Referring to FIGS. 8 and 11, pedal shaft 16 will now be discussed in more detail. First end 22 of pedal shaft 16 is adapted to be fixedly coupled to crank arm 14 in a conventional manner. Specifically, first end 22 is provided with external threads configured to engage internal threads of a respective crank arm. Second end 24 of pedal shaft 16 is designed to rotatably couple pedal body 18 thereto in a relatively conventional manner. An inner sleeve and a pair of bearing assemblies are mounted on second end 24 of pedal shaft 16 to rotatably mount pedal body 18 on shaft 16. A lock bushing screws into a threaded end of shaft support portion 32 of pedal body 18 to secure pedal shaft 16 therewith. As mentioned above, the right bicycle pedal is identical to the left bicycle pedal 10, except that the shaft of the right bicycle pedal has opposite threads from first end 22 of pedal shaft 16. Such an arrangement is well known in the art, and thus, will not be discussed or illustrated in detail herein. Moreover, pedal shaft 16 is relatively conventional. Thus pedal shaft 16 will not be discussed or illustrated in detail herein.

Referring again to FIG. 1, bicycle shoe 12 is a bicycle shoe, which is designed for off-road type bikes. Specifically, in this embodiment, the sole of bicycle shoe 12 is constructed of flexible, resilient material with a rough tread pattern. Thus, bicycle shoe 12 provides traction on the ground and also on the shoe engagement surfaces 36 of bicycle pedal 10. Shoe 12 is conventional, and thus, shoe 12 will not be discussed or illustrated in detail herein. Moreover, bicycle pedal 10 is designed to be used with any type of shoe, such as a running, walking or hiking shoe. Therefore, the design of shoe 12 is not critical to the present invention.

SECOND EMBODIMENT

Figure 12:
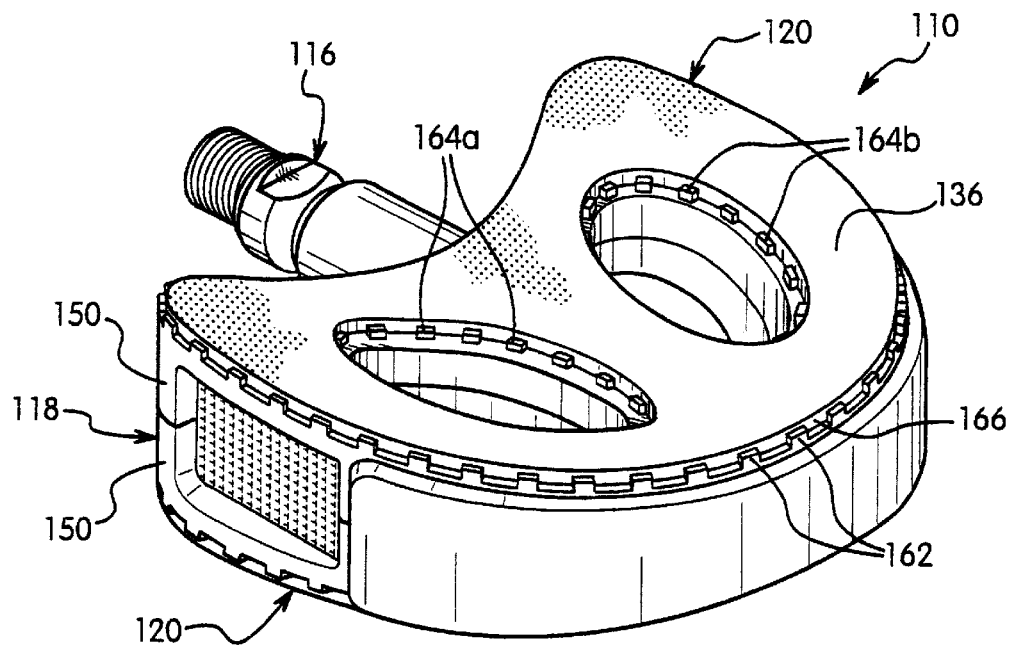
FIG. 12 is an enlarged perspective view of a bicycle pedal in accordance with a second embodiment of the present invention.

Referring to FIG. 12, a bicycle pedal 110 is illustrated in accordance with a second embodiment of the present invention. Bicycle pedal 110 is a modification of bicycle pedal 10 of the first embodiment. More specifically, the bicycle pedal 110 of the second embodiment is identical to bicycle pedal 10 of the first embodiment, except that the continuous wall 62 of the first embodiment has been modified to be a discontinuous wall, as explained below. In view of the similarities between the first and second embodiments, the parts that are similar between the first and second embodiment will not be discussed or illustrated in detail herein. Rather, it will be apparent to those skilled in the art that the description of the parts of the first embodiment apply to the identical or similar parts of the second embodiment, except for as explained below.

Similar to the first embodiment, the bicycle pedal 110 of the second embodiment basically includes a pedal shaft or spindle 116 adapted to be coupled to crank arm 14, a pedal body 118 rotatably coupled to spindle 116, and a pair of abrasive sheets 120 fixedly coupled to opposite sides of pedal body 118. The pedal shaft 116 is identical to pedal shaft 16 of the first embodiment, and thus, the description of pedal shaft 16 applies to pedal shaft 116. Likewise, the abrasive sheets 120 are identical to the abrasive sheets 20 of the first embodiment. Thus, the descriptions of the abrasive sheets 20 apply to the abrasive sheets 120 of the second embodiment.

The pedal body 118, on the other hand, has been modified slightly from the pedal body 18 of the first embodiment. Specifically, pedal body 118 is preferably formed of two foot supporting pieces 150 that are identical to foot supporting pieces 50 of the first embodiment, except that the shoe engagement surfaces 136 of pedal body 118 has a plurality of protrusions 162 that form a discontinuous wall instead of the continuous wall 62 of pedal 18 and a plurality of protrusions 164a and 164b that form discontinuous walls instead of the continuous walls 62, 64a and 64b of pedal 18. The discontinuous walls formed by the protrusions 162, 164a and 164b defined a recess 166 similar to the recess 66 of the first embodiment. Accordingly, protrusions 162, 164a and 164b perform the same functions as the continuous walls 62, 64a and 64b of the first embodiment.

More specifically, protrusions 162, 164a and 164b protect the corresponding abrasive sheet 120 from being peeled or inadvertently removed from the pedal body 118. The remainder of the pedal body 118 of the second embodiment is substantially identical to the pedal body 18 of the first embodiment, and thus, pedal body 118 will not be discussed and/or illustrated in detail herein. It will be apparent to those skilled in the art from this disclosure that both shoe engagement surfaces 136 are preferably identical, i.e., each shoe engagement surface 136 includes an abrasive sheet 120 located in a recess 166 defined by protrusions 162, 164a and 164b.

THIRD EMBODIMENT

Figure 13:
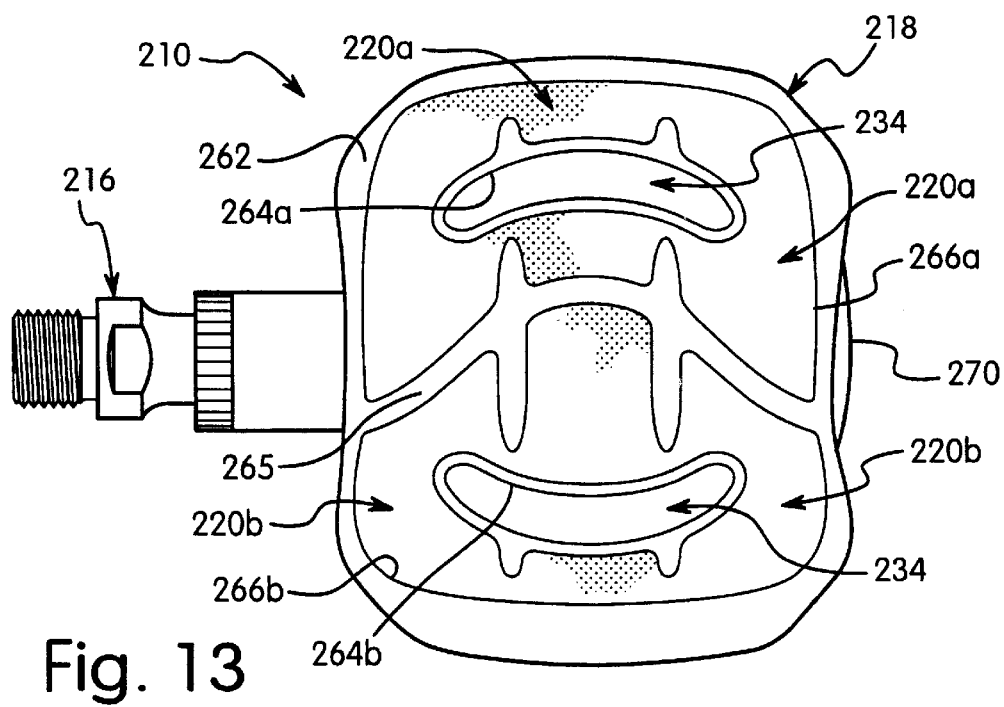
FIG. 13 is a top plan view of a bicycle pedal in accordance with a third embodiment of the present invention.
Figure 14:
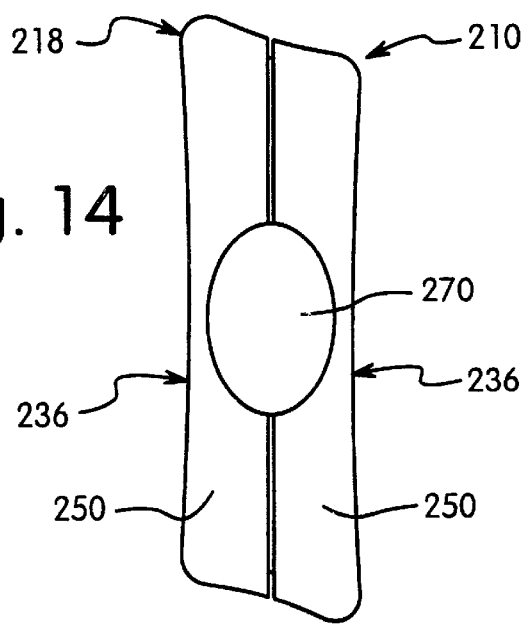
FIG. 14 is an outside elevational view of the bicycle pedal illustrated in FIG. 13 in accordance with the third embodiment of the present invention.
Figure 15:
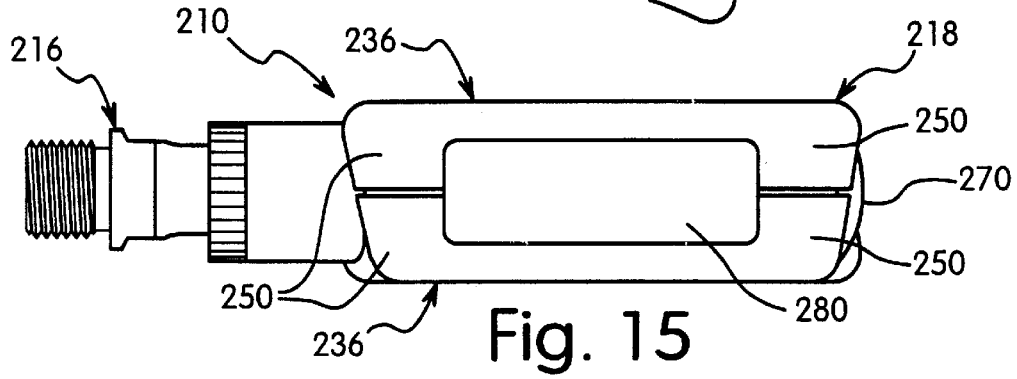
FIG. 15 is an end elevational view of the bicycle pedal illustrated in FIGS. 13 and 14 in accordance with the third embodiment of the present invention.

Referring now to FIGS. 13–15, a bicycle pedal 210 in accordance with a third embodiment of the present invention is illustrated. The basic construction of the third embodiment is similar to the basic construction of the first embodiment, discussed above. However, the shape of pedal 210 has been modified to illustrate some alternatives to the basic concept of the present invention, as explained below. In view of the similarities between pedal 210 of the third embodiment and pedal 10 of the first embodiment, the parts of pedal 210 that are similar to the parts of pedal 10 will not be discussed and/or illustrated in detail herein. Rather, only the significant differences between pedal 210 and pedal 10 will be discussed and/or illustrated herein. Accordingly, it will be apparent to those skilled in the art from this disclosure that the description of the first embodiment applies to this third embodiment, except for as explained below.

Bicycle pedal 210 basically includes a pedal shaft 216 adapted to be coupled to crank arm 14, a pedal body 218 rotatably coupled to pedal shaft 216, and a pair of abrasive sheets 220a and 220b coupled to each side of the pedal body 218. Pedal shaft 216 and its connection to pedal body 218 are identical to the pedal shaft 16 and its connection to pedal body 18, as discussed above with reference to the first embodiment. Thus, pedal shaft 216 and its connection to pedal body 218 will not be discussed and/or illustrated in detail herein.

The construction of the abrasive sheets 220a and 220b is substantially identical to the abrasive sheets 20 of the first embodiment, except for their shapes. Therefore, abrasive sheets 220a and 220b will not be discussed and/or illustrated in detail herein.

Pedal body 218 preferably includes a pair of through openings 234 extending between a pair of shoe engagement surfaces 236. The abrasive sheets 222a and 222b are fixedly coupled to each of the shoe engagement surfaces 236 to improve the frictional characteristics of pedal body 218. Pedal body 218 is preferably formed of two foot supporting pieces 250 similar to the first embodiment, except that the shapes of the foot supporting pieces 250 have been modified.

Each of the foot supporting pieces 250 include one of the shoe engagement surfaces 236.

Each of the shoe engagement surfaces 236 has the basic curvature of shoe engagement surface 36 of the first embodiment. However, each shoe engagement surface 236 has a pair of recesses 266a and 266b that are formed by a continuous outer wall 262, a pair of inner continuous walls 264a and 264b that surround the through openings 234, and an intermediate wall 265 that extends between opposite side edges of continuous wall 266.

Similar to the first embodiment, pedal body 218 preferably includes a side protection element 270 and a pair of reflectors 280. The side protection element 270 and the reflectors 280 are preferably sandwiched in-between the pair of foot supporting pieces 250 of the pedal body 218. Of course, it will be apparent to those skilled in the art from this disclosure that the side protection element 270 and the reflectors 280 can be coupled to the pedal body 218 in other ways. While the shapes of the side protection element 270 and the reflectors 280 are slightly different from the side protection element 70 and the reflectors 80, discussed above, their basic constructions are the same. Thus, the descriptions of the side protection element 70 and the reflectors 80, as discussed above, apply to the side protection element 270 and the reflectors 280 to the extent that those descriptions do not conflict with the illustrations of FIGS. 13–15.

FOURTH EMBODIMENT

Figure 16:
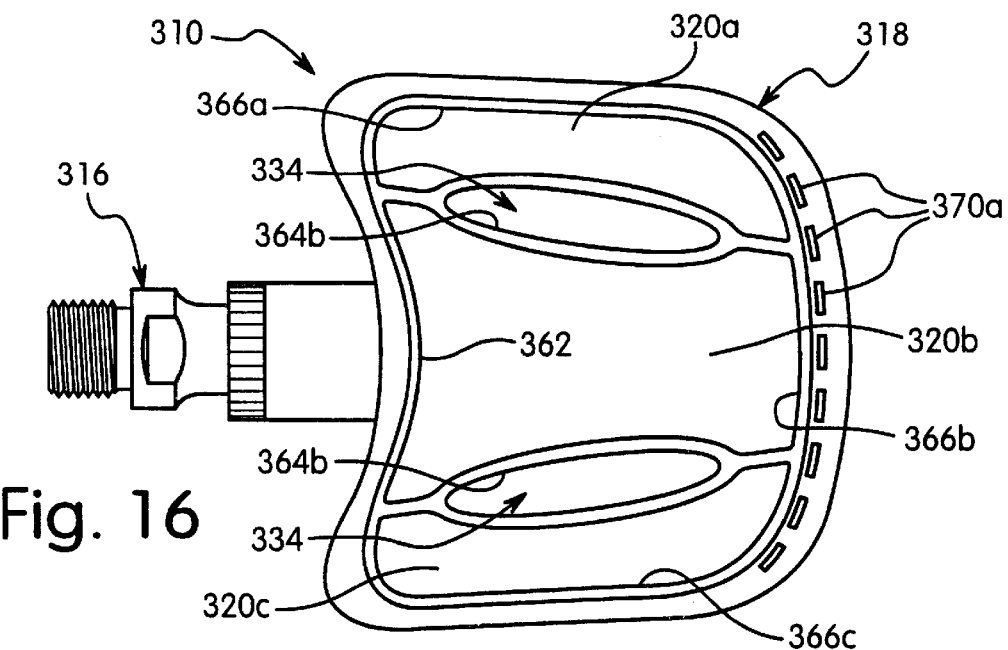
FIG. 16 is a top plan view of a bicycle in accordance with a fourth embodiment of the present invention.
Figure 17:
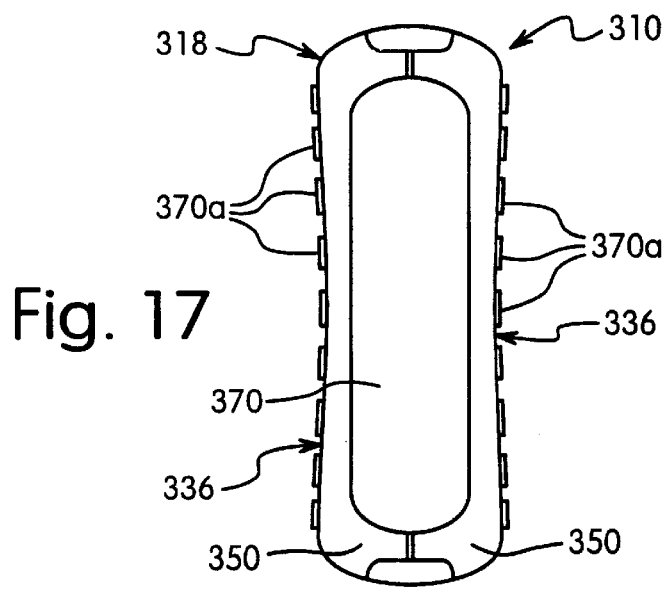
FIG. 17 is an outside elevational view of the bicycle pedal illustrated in FIG. 16 in accordance with the fourth embodiment of the present invention.
Figure 18:
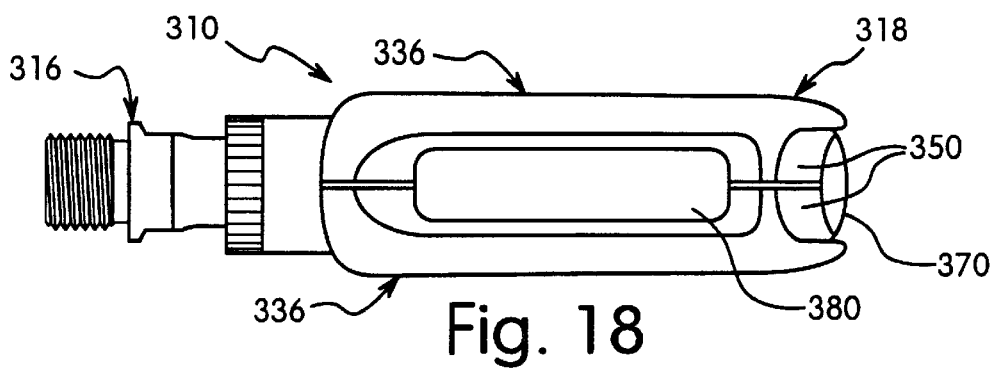
FIG. 18 is an end elevational view of the bicycle pedal illustrated in FIGS. 16 and 17 in accordance with the fourth embodiment of the present invention.

Referring now to FIGS. 16–18, a bicycle pedal 310 in accordance with a fourth embodiment of the present invention is illustrated. The basic construction of the bicycle pedal 310 of the fourth embodiment is similar to the basic construction of the bicycle pedal 10 of the first embodiment, discussed above. However, the shape of pedal 310 has been modified to illustrate a further alternative of the basic concept of the present invention, as explained below. In view of the similarities between the pedal body 310 of the fourth embodiment and the pedal body 10 of the first embodiment, the parts of the pedal 310 that are similar to the parts of the pedal 10 will not be discussed and/or illustrated in detail herein. Rather, only the significant differences between pedals 310 and pedal 10 will be discussed and/or illustrated herein. Accordingly, it will be apparent to those skilled in the art from this disclosure that the description of the first embodiment applies to this fourth embodiment, except for as explained below.

Bicycle pedal 310 basically includes a pedal shaft 316 adapted to be coupled to crank arm 14, a pedal body 318 rotatably coupled to pedal shaft 316, and three abrasive sheets 320a 320b and 320c coupled to each side of the pedal body 318. Pedal shaft 316 and its connection to pedal body 318 are identical to the pedal shaft 16 and its connection to pedal body 18, as discussed above, with reference to the first embodiment. Thus, pedal shaft 316 and its connection to pedal body 318 will not be discussed and/or illustrated in detail herein.

The construction of the abrasive sheets 320a–320c is substantially identical to the abrasive sheets 20 of the first embodiment, except for their shapes. Therefore, abrasive sheets 320a–320c will not be discussed and/or illustrated in detail herein.

Preferably, pedal body 318 also includes a pair of through openings 334 extending between a pair of shoe engagement surfaces 336. Pedal body 318 is formed of two foot supporting pieces 350 similar to the first embodiment, except that the shapes of the foot supporting pieces 350 has been modified. Each of the foot supporting pieces 350 include one of the shoe engagement surfaces 336.

Each of the shoe engagement surfaces 336 has the basic curvature of shoe engagement surface 36 of the first embodiment. However, each of the shoe engagement surfaces 336 has three recesses 366a, 366b and 366c. These recesses 366a–366c are formed by a continuous outer wall 362, and a pair of inner continuous walls 364a and 364b that surround the through openings 334 and that are connected to continuous outer wall 362.

Similar to the first embodiment, pedal body 318 preferably includes a side protection element 370 and a pair of reflectors 380. The side protection element 370 and the reflectors 380 are preferably sandwiched in-between the pair of foot supporting pieces 350 of the pedal body 318. Of course, it will be apparent to those skilled in the art from this disclosure that the side protection element 370 and the reflectors 380 can be coupled to the pedal body 318 in other ways. While the shapes of the side protection element 370 and the reflectors 380 are slightly different from the first embodiment, their basic constructions are the same. Thus, the descriptions of the side protection element 70 and the reflectors 80, as discussed above, apply to the side protection element 370 and the reflectors 380 to the extent that they do not conflict with the illustrations of FIGS. 16–18.

In this embodiment, the side protection element 370 includes a plurality of projections 370a that extend through openings formed in the foot supporting pieces 350 of the pedal body 318. More specifically, the shoe engagement surfaces 336 have a plurality of openings that receive metal projections 370a from the side protection element 370.

FIFTH EMBODIMENT

Figure 19:
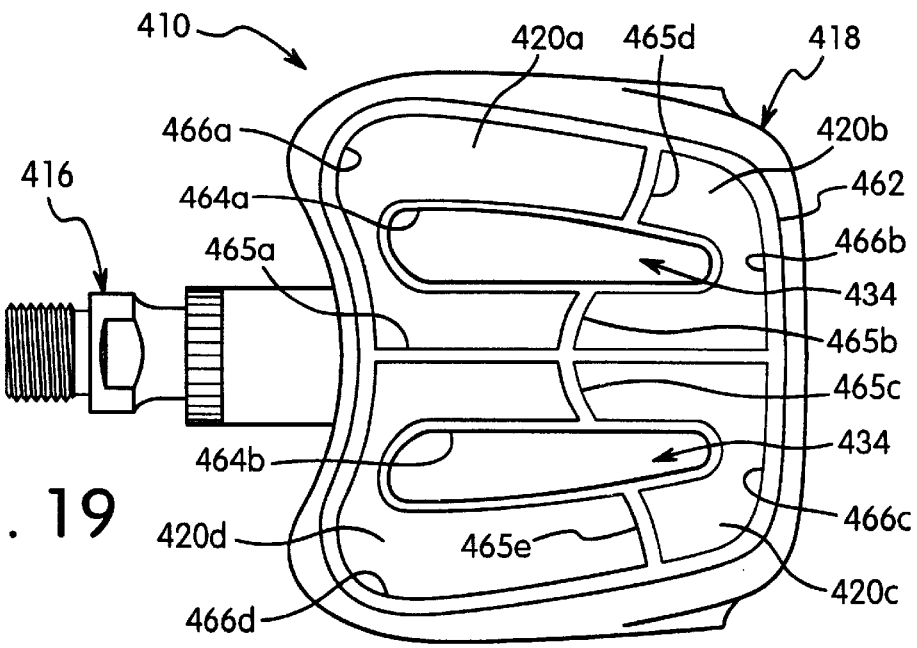
FIG. 19 is a top plan view of a bicycle pedal in accordance with a fifth embodiment of the present invention.
Figure 20:
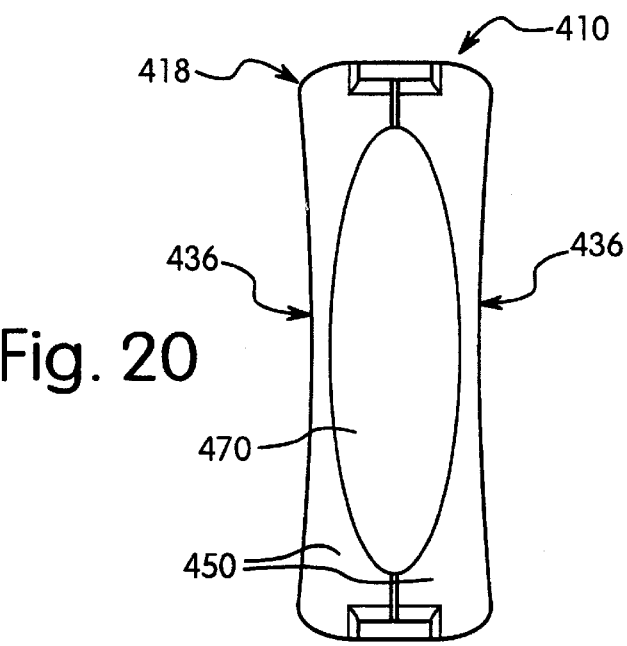
FIG. 20 is an outside elevational view of the bicycle pedal illustrated in FIG. 19 in accordance with the fifth embodiment of the present invention.
Figure 21:
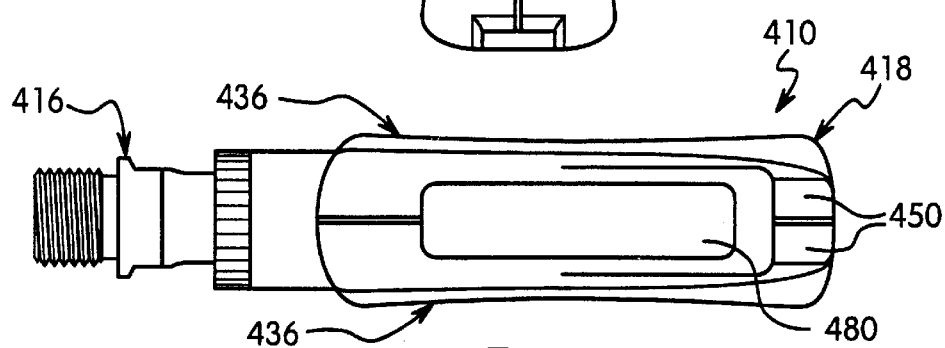
FIG. 21 is an end elevational view of the bicycle pedal illustrated in FIGS. 19 and 20 in accordance with the fifth embodiment of the present invention.

Referring now to FIGS. 19–21, a bicycle pedal 410 in accordance with a fifth embodiment of the present invention is illustrated. The basic construction of the fifth embodiment is similar to the basic construction of the first embodiment, discussed above. However, the shape of pedal 410 has been modified to illustrate an alternative embodiment of the present invention, as explained below. In view of the similarities between pedal 410 of the fifth embodiment and pedal 10 of the first embodiment, the parts of pedal 410 that are similar to the parts of pedal 10 will not be discussed and/or illustrated in detail herein. Rather, only the significant differences between pedal 410 and pedal 10 will be discussed and/or illustrated herein. Accordingly, it will be apparent to those skilled in the art from this disclosure that the description of the first embodiment applies to this fifth embodiment, except for as explained below.

Bicycle pedal 410 basically includes a pedal shaft 416 adapted to be coupled to crank arm 14, a pedal body 418 rotatably coupled to pedal shaft 416 and four abrasive sheets 420a–420d coupled to each side of the pedal body 418. Pedal shaft 416 and its connection to pedal body 418 are identical to the pedal shaft 16 and its connection to pedal body 18, as discussed above with reference to the first embodiment. Thus, pedal shaft 416 and its connection to pedal body 418 will not be discussed and/or illustrated in detail herein.

The construction of the abrasive sheets 420a–420d is substantially identical to the abrasive sheets 20 of the first embodiment, except for their shapes. Therefore, abrasive sheets 420a–420d will not be discussed and/or illustrated in detail herein.

Pedal body 418 preferably includes a pair of through openings 434 extending between a pair of shoe engagement surfaces 436. The abrasive sheets 420a–420d are coupled to each of the shoe engagement surfaces 436 to improve the frictional characteristics of the shoe engagement surfaces 436. Pedal body 418 is preferably formed of two foot supporting pieces 450, similar to the first embodiment, except that the shapes of the foot supporting pieces 450 have been modified. Each of the foot supporting pieces 450 includes one of the shoe engagement surfaces 436.

Each of the shoe engagement surfaces 436 has the basic curvature of shoe attachment surface 36 of the first embodiment. However, each shoe engagement surface 436 has four recesses 466a–466d that receive the abrasive sheets 420a–420d. The recesses 466a–466d are basically formed by a continuous outer wall 462, a pair of inner continuous walls 464a and 464b that surround the through openings 434, and five intermediate wall sections 465a–465e that extend between continuous outer wall 462 and inner continuous walls 464a and 464b.

Similar to the first embodiment, pedal body 418 preferably includes a side protection element 470 and a pair of reflectors 480. The side protection element and the reflectors 480 are preferably sandwiched in-between the pair of foot supporting pieces 450 of the pedal body 418. Of course, it will be apparent to those skilled in the art from this disclosure that the side protection element 470 and the reflectors 480 can be coupled to the pedal body 418 in other ways. While the shapes of the side protection element 470 and the reflectors 480 are slightly different from the side protection element 70 and the reflectors 80, discussed above, their basic constructions are the same. Thus, the descriptions of the side protection element 70 and the reflectors 80, as discussed above, applies to the side protection element 470 and the reflectors 480 to the extent that those descriptions do not conflict with the illustrations of FIGS. 19–21.

SIXTH EMBODIMENT

Figure 22:
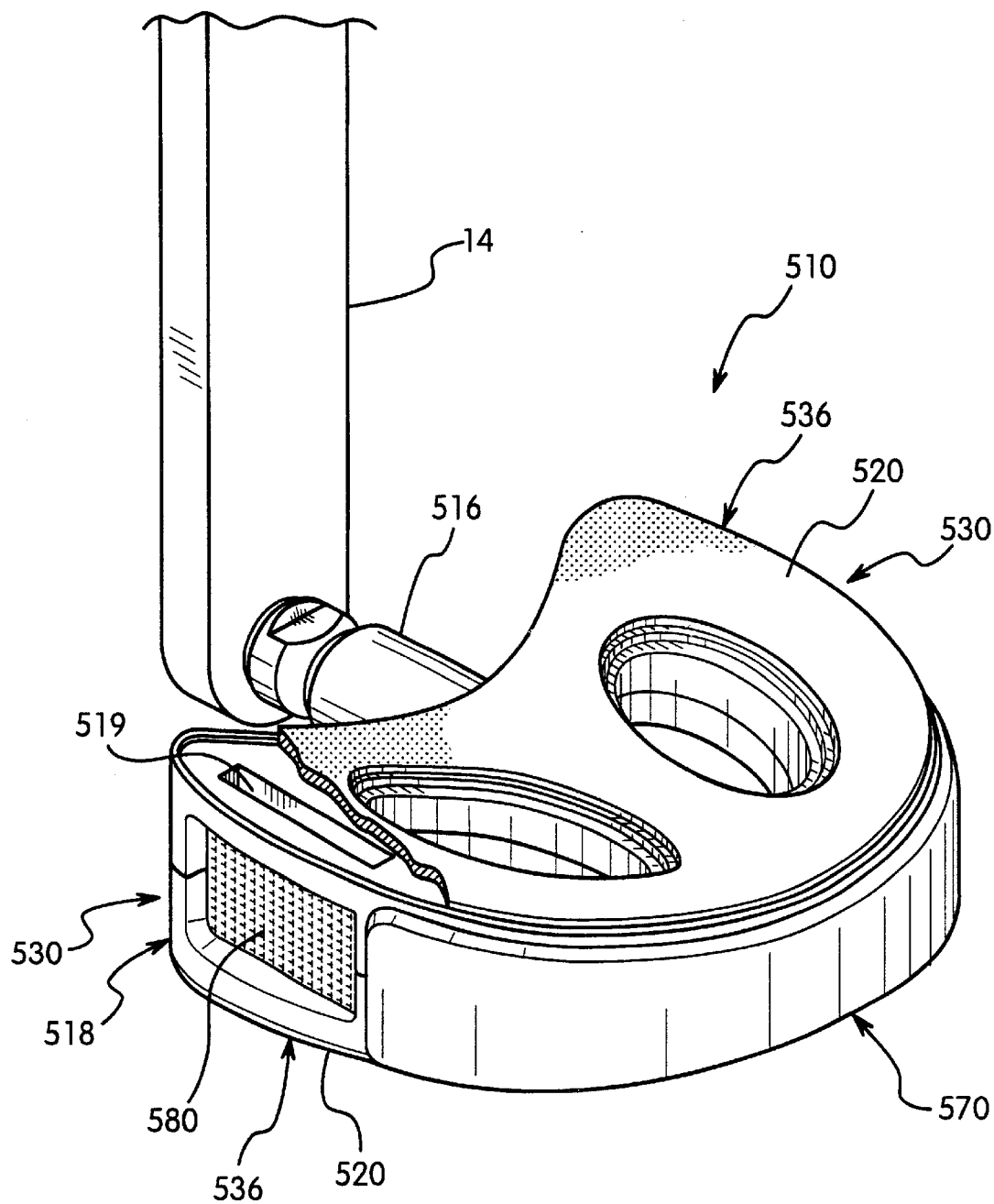
FIG. 22 is an enlarged perspective view of a bicycle pedal in accordance with a sixth embodiment of the present invention, with a portion of the abrasive sheet broken away for the purpose of illustration.

Referring to FIG. 22, a bicycle pedal 510 is illustrated in accordance with a sixth embodiment of the present invention. Bicycle pedal 510 is a modification of bicycle pedal 10 of the first embodiment. More specifically, the bicycle pedal 510 of the sixth embodiment is identical to bicycle pedal 10 of the first embodiment, except that the pedal body of the sixth embodiment is formed as a one-piece unitary member. In view of the similarities between the first and sixth embodiments, the parts that are similar between the first and sixth embodiment will not be discussed or illustrated in detail herein. Rather, it will be apparent to those skilled in the art that the description of the parts of the first embodiment apply to the identical or similar parts of the sixth embodiment, except for as explained below. It will also be apparent to those skilled in the art that the modifications of this sixth embodiment could be applied to the second, third, fourth and fifth embodiments as needed and/or desired.

Similar to the first embodiment, the bicycle pedal 510 of the sixth embodiment basically includes a pedal shaft or spindle 516 adapted to be coupled to crank arm 14, a pedal body 518 rotatably coupled to spindle 516, and a pair of abrasive sheets 520 fixedly coupled to opposite sides of pedal body 518. The pedal shaft 516 is identical to pedal shaft 16 of the first embodiment, and thus, the description of pedal shaft 16 applies to pedal shaft 516. Likewise, the abrasive sheets 520 are identical to the abrasive sheets 20 of the first embodiment. Thus, the descriptions of the abrasive sheets 20 apply to the abrasive sheets 520 of the sixth embodiment.

The pedal body 518, on the other hand, has been modified slightly from the pedal body 18 of the first embodiment.

Specifically, pedal body 518 is preferably formed as a one-piece unitary member with a pair of open ended reflector receiving slots 519 configured to receive reflectors 580 therein. Reflectors 580 are identical to the reflectors 80 of the first embodiment. Thus, the descriptions of the reflectors 80 apply to the reflectors 580 of the sixth embodiment. Preferably, one of the reflector receiving slots 519 is open and extends inwardly from one of the shoe engagement surfaces 536 while the other of the reflector receiving slots 519 is open and extends inwardly from the other shoe engagement surface 536. In other words, one slot 519 is preferably formed in one end 530 and extends from one side of pedal body 518 while the other slot 519 is formed in the opposite end 530 and extends from the opposite side of pedal body 518.

Alternatively, both reflector receiving slots 519 could be open and extend from a single shoe engagement surface 536. In any case, abrasive sheets 520 are coupled to shoe engagement surfaces 536 after reflectors 580 are mounted in reflector receiving slots 519 such that the open ends of reflector receiving slots 519 are covered by abrasive sheets 520. Additionally, reflector receiving slots 519 are configured to retain reflectors 580 therein. Specifically, reflector receiving slots 519 are designed to frictionally retain reflectors 580 therein via a press fit. Of course it will be apparent to those skilled in the art that reflectors 580 could be retained in slots 519 by any suitable method such as by a snap-fit or adhesive.

Pedal body 518 preferably does not include the closed hollow areas of the first embodiment (because pedal body 518 is formed as one-piece). However, pedal body 518 could have open hollow areas formed therein if needed and/or desired in order to reduce weight. Pedal body 518 preferably includes a modified side protection element 570 coupled thereto by adhesive or a press fit. In other words, pedal body 518 can be formed with holes and side protection element 570 could be formed with mating projections press fit into the holes formed in pedal body 518. Alternatively, side protection element 570 could be coupled to pedal body 518 via adhesive. Of course, side protection element 570 could be coupled to pedal body 518 by any suitable method as needed and or desired. Moreover, pedal body 518 can be formed by any suitable manufacturing technique such as injection molding and/or machining.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal comprising:
  a pedal shaft having a first end adapted to be coupled to a bicycle crank, a second end, and a center axis extending between said first and second ends;

a pedal body rotatably coupled to said second end of said pedal shaft, said pedal body having a first concave shoe engagement surface facing in a first direction and a first opening extending through said pedal body, said first opening arranged along a longitudinal axis that is angled relative to said center axis of said pedal shaft, said first opening being substantially symmetrical about said longitudinal axis; and a first abrasive sheet fixedly coupled to said first concave shoe engagement surface and completely surrounding said first opening, said first concave shoe engagement surface and said first abrasive sheet being configured to enhance engagement of said pedal with a shoe.

2. A bicycle pedal according to claim 1, wherein said first abrasive sheet includes a first aperture aligned with said first opening of said pedal body.

3. A bicycle pedal according to claim 2, wherein said first opening of said pedal body and said first aperture of said first abrasive sheet are oval shaped.

4. A bicycle pedal according to claim 3, wherein said pedal body includes a second opening extending therethrough and said first abrasive sheet includes a second aperture aligned with said second opening.

5. A bicycle pedal according to claim 4, wherein said first and second openings of said pedal body and said first and second apertures of said first abrasive sheet are oval shaped.

6. A bicycle pedal according to claim 5, wherein said first and second oval shaped openings of said pedal body are located on opposite sides of said center axis of said pedal shaft.

7. A bicycle pedal according to claim 5, wherein said pedal body further including an outer peripheral wall having an outer surface;

said first oval shaped opening being formed from a first outer concave surface and an opposed first inner concave surface; and said second oval shaped opening being formed from a second outer concave surface and an opposed second inner concave surface, said first and second outer concave surfaces being substantially parallel to said outer surface of said outer peripheral wall of said pedal body, said first outer concave surface being spaced a first distance inwardly from said outer surface of said outer peripheral wall, said second outer concave surface being spaced a second distance inwardly from said outer surface of said outer peripheral wall, said first distance being substantially equal to said second distance.

8. A bicycle pedal according to claim 5, wherein said first abrasive sheet fixedly coupled to said first concave shoe engagement surface completely surrounds said second opening.

9. A bicycle pedal according to claim 4, wherein said pedal body includes a second concave shoe engagement surface facing in a second direction opposite said first direction such that said first and second openings of said pedal body extend between said first and second concave shoe engagement surfaces, said second concave shoe engagement surface having a second abrasive sheet fixedly coupled thereto, and said second abrasive sheet includes a third aperture aligned with said second opening of said pedal body and a fourth aperture aligned with said first opening of said pedal body.

10. A bicycle pedal according to claim 1, wherein said pedal body includes a second concave shoe engagement surface with a second abrasive sheet fixedly coupled thereto, said second concave shoe engagement surface spaced from said first concave surface and facing in a second direction opposite said first direction.

11. A bicycle pedal according to claim 1, wherein said first abrasive sheet is fixedly coupled to said first shoe engagement surface by adhesive.

12. A bicycle pedal according to claim 1, wherein said pedal body includes an inner longitudinal side with said pedal shaft extending therefrom and an outer longitudinal side with a side protection element coupled thereto.

13. A bicycle pedal according to claim 12, wherein said side protection element has a curved outer surface.

14. A bicycle pedal according to claim 12, wherein said side protection element is formed of metal.

15. A bicycle pedal according to claim 14, wherein said metal side protection element includes a plurality of protrusions extending therefrom.

16. A bicycle pedal according to claim 12, wherein said side protection element is formed of soft plastic.

17. A bicycle pedal according to claim 1, wherein said first concave shoe engagement surface includes first and second curvatures that cross each other and have different centers.

18. A bicycle pedal according to claim 1, wherein said first abrasive sheet is formed of at least two separate pieces.

19. A bicycle pedal according to claim 1, wherein said pedal body has a maximum transverse width measured in a direction substantially parallel to said center axis and said first opening has a maximum transverse dimension greater than one half of said maximum transverse width of said pedal body.

20. A bicycle pedal comprising:

a pedal shaft having a first end adapted to be coupled to a bicycle crank and a second end;

a pedal body rotatably coupled to said second end of said pedal shaft, said pedal body having a concave shoe engagement surface with a length, a width and first and second curvatures, said first curvature having a first radius and said second curvature having a second radius larger than said first radius; and a single abrasive sheet fixedly coupled to said concave shoe engagement surface, said concave shoe engagement surface and said single abrasive sheet being configured to enhance engagement of said pedal with a shoe, said pedal body having at least one opening extending therethrough, said single abrasive sheet surrounding said at least one opening, said at least one opening and said single abrasive sheet being arranged and configured to prevent wrinkling of said single abrasive sheet coupled to said concave shoe engagement surface.

21. A bicycle pedal according to claim 20, wherein said first curvature lies in a first plane and said second curvature lies in a second plane substantially perpendicular to said first plane.

22. A bicycle pedal according to claim 21, wherein said first plane intersects and extends substantially perpendicular to a center axis of said pedal shaft.

23. A bicycle pedal according to claim 20, wherein
said second radius of curvature is between about 1.2 and about 1.8 times larger than said first radius of curvature.

24. A bicycle pedal comprising:

a pedal shaft having a first end adapted to be coupled to a bicycle crank and a second end;

a pedal body rotatably coupled to said second end of said pedal shaft, said pedal body having a shoe engagement surface with a recess and at least one opening extending through said pedal body, said recess having depth; and a single abrasive sheet fixedly coupled within said recess to enhance engagement of said pedal with a shoe, said single abrasive sheet surrounding said at least one opening, said single abrasive sheet having a thickness that is greater than said depth of said recess.

25. A bicycle pedal according to claim 24, wherein
said recess is formed by a continuous wall located around an outer periphery of said shoe engagement surface.

26. A bicycle pedal comprising:

a pedal shaft having a first end adapted to be coupled to a bicycle crank and a second end;

a pedal body rotatably coupled to said second end of said pedal shaft, said pedal body having a shoe engagement surface with a recess, said recess having depth, said recess being formed by a plurality of projections located around an outer periphery of said shoe engagement surface; and an abrasive sheet fixedly coupled within said recess to enhance engagement of said pedal with a shoe, said abrasive sheet having a thickness that is greater than said depth of said recess.

27. A bicycle pedal comprising:

a pedal shaft having a first end adapted to be coupled to a bicycle crank and a second end;

a pedal body rotatably coupled to said second end of said pedal shaft, said pedal body having first and second openings extending therethrough, an outer peripheral wall with an outer surface, and a concave shoe engagement surface, said first opening being formed from a first outer concave surface and an opposed first inner concave surface, said second opening being formed from a second outer concave surface and an opposed second inner concave surface, said first inner and outer concave surfaces and said second inner and outer concave surfaces extending from said concave shoe engagement surface, said first inner and outer concave surfaces being substantially mirror images of each other and said second inner and outer concave surfaces being substantially mirror images of each other, said first and second outer concave surfaces being substantially parallel to said outer surface of said outer peripheral wall of said pedal body, said first outer concave surface being spaced a first distance inwardly from said outer surface of said outer peripheral wall, said second outer concave surface being spaced a second distance inwardly from said outer surface of said outer peripheral wall, said first distance being substantially equal to said second distance; and a single abrasive sheet fixedly coupled to said concave shoe engagement surface and surrounding said first and second openings of said pedal body, said single abrasive sheet having first and second apertures aligned with said first and second openings, respectively, said concave shoe engagement surface and said single abrasive sheet being configured to enhance engagement of said pedal with a shoe.

28. A bicycle pedal according to claim 27, wherein
said pedal body has a maximum transverse width measured in a direction substantially parallel to a center axis of said pedal shaft and at least one of said openings has a maximum transverse dimension greater than one half of said maximum transverse width of said pedal body.

* * * * *